United States Patent [19]
Pon et al.

[11] Patent Number: 6,047,251
[45] Date of Patent: Apr. 4, 2000

[54] AUTOMATIC LANGUAGE IDENTIFICATION SYSTEM FOR MULTILINGUAL OPTICAL CHARACTER RECOGNITION

[75] Inventors: Leonard K. Pon, Los Gatos; Tapas Kanungo, San Jose; Jun Yang, Los Gatos; Kenneth Chan Choy, Los Gatos; Mindy R. Bokser, Los Gatos, all of Calif.

[73] Assignee: Caere Corporation, Los Gatos, Calif.

[21] Appl. No.: 08/929,788

[22] Filed: Sep. 15, 1997

[51] Int. Cl.[7] .............................. G06F 17/28; G06K 9/72
[52] U.S. Cl. .................................. 704/1; 704/9; 382/229
[58] Field of Search ............ 704/7, 9, 10; 382/175–177, 382/228, 231, 229, 181

[56] References Cited

U.S. PATENT DOCUMENTS

| | | | |
|---|---|---|---|
| 3,988,715 | 10/1976 | Mullan et al. | 382/228 |
| 4,829,580 | 5/1989 | Church | 704/9 |
| 5,062,143 | 10/1991 | Schmitt | 704/9 |
| 5,182,708 | 1/1993 | Ejiri | 704/9 |
| 5,371,807 | 12/1994 | Register et al. | 704/9 |
| 5,418,951 | 5/1995 | Damashek | 704/9 |
| 5,548,507 | 8/1996 | Martino et al. | 704/9 |

OTHER PUBLICATIONS

Anigbogu, J.C. et al, "Application of Hidden Markov Models to Multifont Text Recognition", 1st Int. Conference on Document Analysis and Recognition, Sep. 30–Oct. 2, 1991, Los Alamitos, CA, US, pp. 785–793.

Spitz, A. Lawrence et al, "Palace: A Multilingual Document Recognition System", Fuji Xerox Palo Alto Laboratory, Palo Alto, CA 94304, USA. pp. 16–36.

"QuickFrame Enhances Processing of Tough "Real World" Forms", Mitek QuickFrame, Mitek Systems, Inc, pp. 1–4.

Lee, Dar–Shyang et al, "Language Identification in Complex, Unoriented, and Degraded Document Images", Proc. Of IAPR Workshop on Document Analysis Systems, 1996, pp 76–98.

Spitz, A. Lawrence, "Script and Language Determination from Document Images", Proc. Of Symp. On Document Analysis and Information Retrieval, pp. 229–235.

Sibun, Penelope et al, "*Language Identification: Examining the Issues*", The Institute for the Learning Sciences, Northwestern University, Dept. Of Computer and Information Science, University of Pennsylvania, pp. 125–135.

*Primary Examiner*—Forester W. Isen
*Assistant Examiner*—Patrick N. Edouard
*Attorney, Agent, or Firm*—Burns, Doane, Swecker & Mathis, L.L.P.

[57] ABSTRACT

The disclosed invention utilizes a dictionary-based approach to identify languages within different zones in a multilingual document. As a first step, a document image is segmented into various zones, regions and word tokens, using suitable geometric properties. Within each zone, the word tokens are compared to dictionaries associated with various candidate languages, and the language that exhibits the highest confidence factor is initially identified as the language of the zone. Subsequently, each zone is further split into regions. The language for each region is then identified, using the confidence factors for the words of that region. For any language determination having a low confidence value, the previously determined language of the zone is employed to assist the identification process.

16 Claims, 9 Drawing Sheets

AUTOMATIC LANGUAGE IDENTIFICATION SYSTEM FOR MULTILINGUAL OPTICAL CHARACTER RECOGNITION

FIELD OF THE INVENTION

The present invention is generally directed to the discrimination between various languages in communications, and more specifically to the automatic recognition of different languages in a multilingual document, for optical character recognition purposes and the like.

BACKGROUND OF THE INVENTION

Generally speaking, optical character recognition involves the parsing of an image of a document into individual symbols and groups of symbols, and comparing the images of the symbols to pattern information representative of various characters related to the letters of an alphabet, numbers, and the like. To increase the accuracy of the recognition process, OCR engines employ techniques that are based upon the characteristics of a particular language. For instance, information about a particular language can be used to select appropriate classifiers, dictionaries, bigram and trigram symbol probabilities, as well as to recognize language-specific formats for dates, numbers, etc.

In the past, if an OCR system was capable of recognizing text in different languages, the user was required to manually specify the language of the text in a scanned image, to enable the OCR system to accurately recognize the symbols and words in the document image. For a single-language document, this task was relatively simple. However, for optimal OCR processing of multi-lingual pages, different zones containing text in different respective languages needed to be demarcated, and each zone identified with the correct language label. The need for such manual intervention can be labor intensive, which results in greater expense and significantly slows down the overall image-to-text conversion process.

As businesses continue to grow globally, multi-lingual documents are becoming more common. Examples of such documents include user manuals that are targeted for multiple countries, and hence might have multiple languages on one page, and travel brochures which provide concise amounts of information in a variety of multi-lingual layouts. In these types of documents, the same type of information might be described in different languages in either different paragraphs, columns or pages. Other examples of multi-lingual documents include airline magazines that provide information for international tourists and business travelers, international business correspondence which may have a heading in the language of the originating country and a main body in the language of the destination country, and immigration documents which contain instructions in multiple languages. Thus, there is a growing need for the ability to automatically discriminate between, and identify, different languages in a single document.

In the past, efforts at automatic language identification have employed one of two general approaches. In one approach, the language identification relies on features that are extracted from images of word tokens. Examples of this approach are described, for example in T. Nakayama and A. L. Spitz, "European Language Determination From Image", *Proc. of Int. Conf. on Document Analysis and Recognition*, Tsukuba, Japan, 1993; P. Sibun and A. L. Spitz, "Language Determination: Natural Language Processing From Scanned Document Images", *Proc. of Conf. on App. Natural Language Processing*, Stuttgart, Germany, 1994; and A. L. Spitz, "Script And Language Determination From Document Images", *Proc. of Symp. on Document Analysis and Information Retrieval*, Las Vegas, Nev., 1994. Techniques of the type described in these references require a significant amount of text in the subject language, in order for the identification to be reliable. If the text language changes on a relatively frequent basis, e.g., from line to line, it is not possible to obtain sufficient statistical feature-based evidence to distinguish one language from the other.

A second approach to language identification utilizes word frequency and bigram probabilities. Examples of this approach are described in H. S. Baird, D. Gilbert, and D. J. Ittner, "A Family Of European Page Readers", *Proc. of Int. Conf. on Pattern Recognition*, Jerusalem, Israel, 1994; and D. Lee, C. Nohl, and H. Baird, "Language Identification In Complex, Unoriented, And Degraded Document Images", *Proc. of IAPR Workshop on Document Analysis Systems*, Malvern, Pa., 1996. This to approach is only applicable to documents of the type in which each page contains text in a single language. It does not provide the capability to distinguish between two different languages on the same page, absent prior manual segmentation. Furthermore, it requires document images having relatively high fidelity, in order to provide reliable transition probabilities for the language models.

It is desirable, therefore, to provide a system for automatically distinguishing between and identifying multiple languages which does not require prior manual input and which is capable of partitioning an image into homogenous language regions, to reliably identify a plurality of different languages on a single page, and thereby enable optical character recognition to be effected with greater speed and accuracy.

SUMMARY OF THE INVENTION

In pursuit of the foregoing objectives, the present invention utilizes a dictionary-based approach to partition different portions of a document image into homogenous language regions. The partitioning of the document can be carried out using a top-down approach, a bottom-up approach, or a hybrid of the two. In the top-down approach, the document image is segmented into zones and word tokens, using suitable geometric properties. Within each zone, the word tokens are compared to dictionaries associated with each of the various candidate languages, to define a confidence factor for each language. The language with the highest confidence factor is initially identified as the language of the zone. Each zone is split into local regions, each of which can comprise a single word or a grouping of words, such as a line. The language for each local region is identified, using a dictionary-based confidence factor for the words of that region. The local regions are then separated according to the language associated with each.

In the bottom-up approach, the document image is parsed into individual word tokens, and a confidence factor is determined for each word, for each candidate language. The document image is divided into local regions, which again can comprise a single word or a grouping of words, such as a line. The language for each local region is identified, using a dictionary-based confidence factor for the words of that region. The local regions having a common language are then grouped according to the language associated with each, to provide the homogenous language regions.

In the hybrid approach, the document image is first segmented into one or more zones, and a language is identified for each zone. Thereafter, the bottom-up approach is carried out, and the zone language is employed in the determination of the groupings of local regions to form the homogenous language regions.

Further features of the invention, and the advantages provided thereby, are described in detail hereinafter with reference to exemplary embodiments illustrated in the accompanying drawings.

DETAILED DESCRIPTION

To facilitate an understanding of the present invention, it is described hereinafter with particular reference to the optical character recognition of a document page containing text in multiple languages. While the present invention is particularly suited for such an application, it will be appreciated that it is not limited to this particular type of use. Rather, the principles which underlie the invention can be employed in a variety of different contexts, wherever the need to distinguish between, and identify, different languages is desirable.

The automatic identification of languages, and more generally, optical character recognition, can be carried out on a variety of computer systems. While the particular hardware components of a computer system do not form part of the invention itself, they are briefly described herein to provide a thorough understanding of the manner in which the features of the invention cooperate with the components of a computer system, to produce the desired results.

Figure 1:
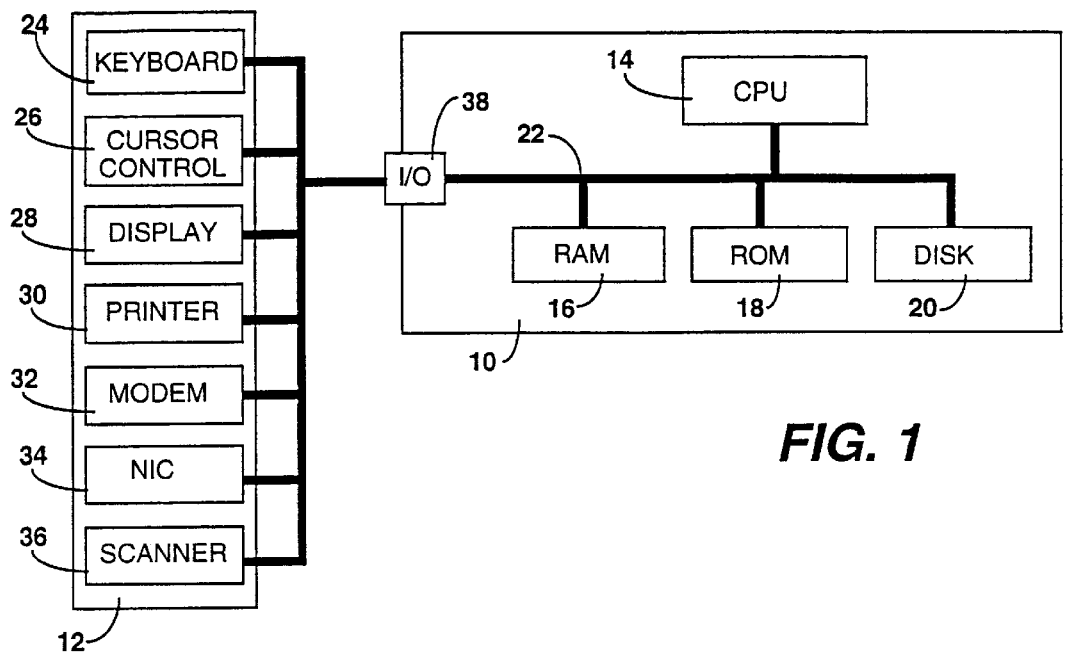
FIG. 1 is a block diagram of a computer system of the type in which the present invention might be employed.

Referring to FIG. 1, an exemplary computer system includes a computer 10 having a variety of external peripheral devices 12 connected thereto. The computer 10 includes a central processing unit 14 and associated memory. This memory generally includes a main, or working memory which is typically implemented in the form of a random access memory 16, a static memory that can comprise a read only memory 18, and a permanent storage device, such as a magnetic or optical disk 20. The CPU communicates with each of these forms of memory through an internal bus 22. The peripheral devices 12 include a data entry device such as a keyboard 24, and a pointing or cursor control device 26 such as a mouse, pen or the like. A display device 28, such as a CRT monitor or an LCD screen, provides a visual display of the information that is being processed within the computer, for example an image of a document that is undergoing optical character recognition. A hard copy of the information can be provided through a printer 30, or similar such device. Communications with other computers can be conducted by a modem 32, and/or a network interface card 34. A scanner 36 can be used to convert a hard copy of a document into an electronic format to be stored, manipulated and processed within the computer. Each of these external peripheral devices exchanges data with the CPU 14 by means of one or more input/output ports 38 on the computer.

In operation, the user may scan a document via the scanner 36, as a result of which a data file which describes the image of the document is stored in the main memory 16. The scanned document might also be displayed on the monitor 28. While the contents of the image file are stored in the main memory 16, OCR processing might be performed on it, to derive character data for the textual portion of the image. The result of the optical character recognition is the generation of a separate data file, such as an ASCII file. Either or both of the image file and the character data file can be stored in the permanent storage device 20, and/or transmitted to another computer via the modem 32 or a network.

Figure 2:
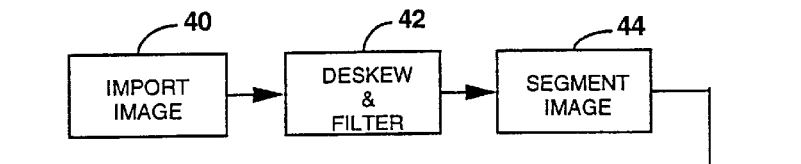
FIG. 2 is a block diagram illustrating the general steps that are carried out in the optical character recognition of a document.
Figure 3:
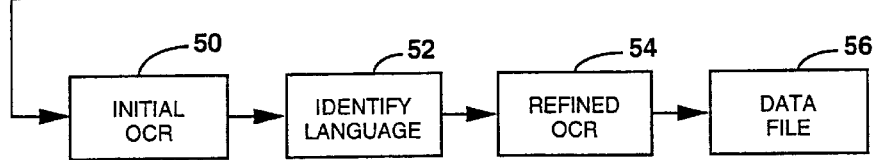
FIG. 3 is a schematic representation of a multi-lingual document.
Figure 3:
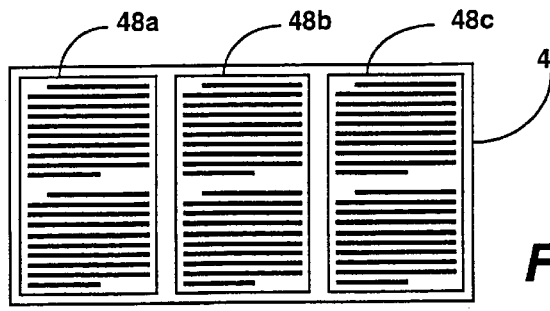

FIG. 2 illustrates the basic steps that are carried out by the computer's CPU 14 during a typical optical character recognition process. Referring thereto, the image of the document is first imported into the computer at step 40, for example by means of the scanner 36 or by being downloaded via a communications network. In an optional preprocessing step 42, the image of the document is corrected for skew, and otherwise filtered to remove artifacts that could interfere with the character recognition procedure. For example, if a faulty scanner introduces a vertical line along the image, this line can be detected and suitably removed before further processing. Thereafter, the document image is segmented into a number of zones at step 44. One example of such segmentation is illustrated in FIG. 3. In the example of this figure, a page 46 contains three columns of text, each consisting of two paragraphs. If the document is a multi-lingual user manual, for example, each column, or each individual paragraph, might contain text in a different language. The segmentation of the image may result in dividing the document into three zones 48a, 48b and 48c which respectively correspond to the three columns. Depending upon the degree of precision desired, the document can be more finely divided into smaller zones. For example, each paragraph might constitute a different zone, or even each line or half-line. In general, a zone can be any portion of the document which contains two or more word tokens.

The preprocessing steps for the correction of skew and removal of artifacts, as well as the segmentation of the document, can be carried out in accordance with any of a variety of well known techniques. Examples of such techniques are described in *Document Image Analysis*, by L. O'Gorman and R. Kasturi, IEEE Comp. Soc. Press, 1995, particularly Chapter 4, the disclosure of which is incorporated herein by reference.

Once the document has been divided into segments, the individual word tokens, i.e., groupings of character symbols that appear to form individual words, are identified, again using conventional optical character recognition techniques. For each word token, one or more hypotheses are generated for the possible character strings that constitute the word token at step 50, using a symbol classifier. Detailed information regarding such classifiers, and their operation, can be found in *Pattern Classification and Scene Analysis*, by Duda and Hart, Wiley & Sons, 1973. The result of the initial OCR step 50 is an estimate of the characters in each of the individual word tokens. Each estimate, or word hypothesis, can have an associated recognition probability which indicates the likelihood that the estimate is a proper one, relative to other word estimates for the same word token.

Generally speaking, optical character recognition employs a classifier that recognizes patterns, or symbols, that correspond to the characters of an alphabet, numbers, punctuation marks, etc. When the specific language of a document being processed is known, the classifier can be tailored to that language. However, in the example of FIG. 3, multiple languages are present, which may not be known a priori. In this case, the character classifier that is employed for the generation of the initial word hypotheses is preferably one that is generic to all of the candidate languages that are to be recognized. For example, if the optical character recognition technique is designed to identify, and discriminate between, the various Romance languages, the generic symbol classifier can be set up to recognize all or most of the symbols in those languages. As an alternative to the use of a generic classifier, it is possible to employ a classifier that is specific to one language, but which is augmented with post-processing capabilities to recognize symbols which may not appear in that language.

Once the words have been initially estimated, the language associated with the text in each of the zones is identified at step 52, as described in greater detail hereinafter. As a result, more aggressive optical character recognition, which provides a greater degree of accuracy, can then be carried out at step 54 with the use of classifiers that are specific to each identified language. The end product of this process is a data file 56 which represents the individual characters of text in the original image, such as an ASCII file.

Generally speaking, the present invention employs a dictionary-based approach, in which a dictionary of words found in a particular language is used to identify text in that language. For each candidate language that is to be identified, a dictionary is established for words in that language. Thus, for example, if languages based upon Roman alphabets are to be identified, a dictionary might be established for each of the following languages: American English, British English, French, Italian, German, Swedish, Norwegian, Finnish, Danish, Portuguese, Brazilian Portuguese, Spanish and Dutch. Each dictionary may be a partial dictionary, containing only the most common words in the language, or a full dictionary which contains a more complete set of words from the language. The dictionary may contain statistical information about the words as well, for example the frequency with which they normally appear in the language. As an alternative to using a separate dictionary for each candidate language, it is possible to employ a single dictionary which contains all of the words for the various candidate languages. In this case, each entry in the dictionary includes data which indicates the languages in which that word appears.

In one embodiment of the invention, a confidence statistic is computed for each candidate language, for each of the zones 48a-48c of the document. In one relatively simple implementation of the invention, the confidence statistic can be computed by counting the number of words in the zone that are found in each of the respective dictionaries. Other, more complex approaches can also be employed to compute the confidence statistic, as described in detail hereinafter.

The language with the highest confidence statistic is ascertained, and used as an initial estimate of the language for the zone.

Depending on how finely it is carried out, it may be the case that zone segmentation does not result in zones that each contain only one language. For instance, in the example of FIG. 3 each of the two paragraphs in the respective zones 48a-48c may be in a different language. Therefore, after the initial zone language has been identified, each of the zones is further split into local regions. A local region can be as small as an individual word token. More preferably, however, a local region consists of a logical group of words, such as one or more lines of the document. The language for each region is identified, using a dictionary-based confidence statistic for the region. Consecutive regions with the same language identity are then merged. In any given region, if none of the candidate languages has a high language confidence statistic, the zone language associated with that region is used as a default region language identity.

Figure 4:
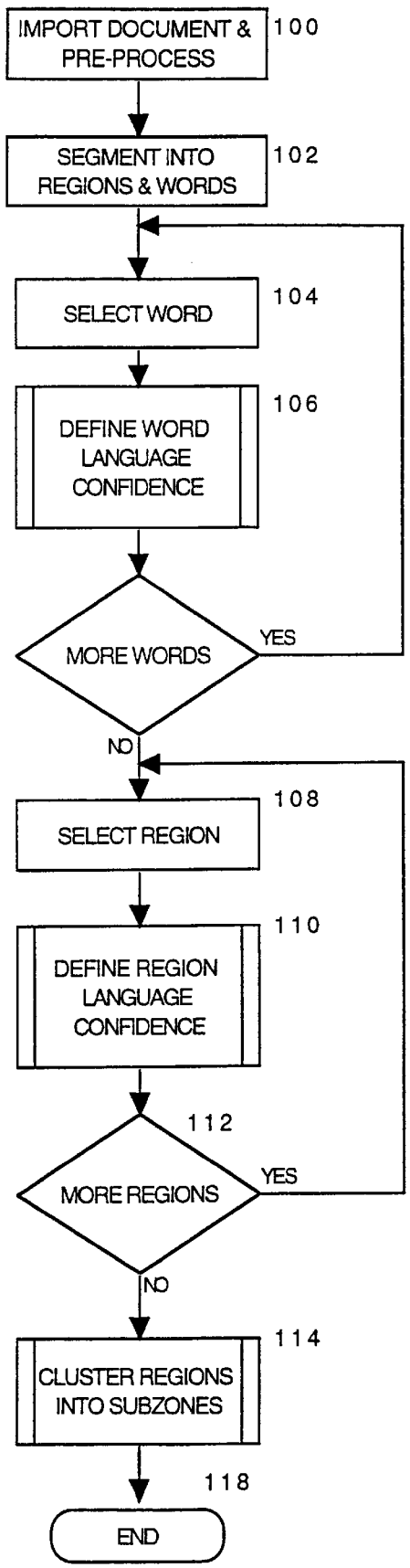
FIG. 4 is a flowchart of the overall process of a first embodiment of the present invention.

The foregoing procedure for segmenting a document into homogeneous language regions can be implemented in different ways, in accordance with the invention. Embodiments of the invention which depict these different approaches are illustrated in greater detail in the flowcharts of FIGS. 4-11. Generally speaking, the different approaches can be classified as a bottom-up approach, a top-down approach, and a hybrid approach which employs concepts from each of the other two approaches. FIG. 4 depicts the overall language recognition procedure in accordance with the bottom-up approach. At step 100, the document is scanned, or an image of the document is otherwise imported into the random access memory 16 of the computer. Preliminary processing can be conducted on the image, for example to correct for skew so that the lines of text are oriented in a horizontal direction, and otherwise filter out obvious artifacts. At step 102, the image of the document is segmented into word tokens and local regions, based upon geometric properties of the image, using conventional techniques. To facilitate an understanding of the invention, the following example will be described in which each local region comprises one line of text in the document. It will be appreciated, however, that a local region can be of any desired size, even as small as an individual word.

Once the segmentation of the document into words and local regions has been completed, a word is selected at step 104 and a routine 106 is carried out, to define language confidence statistics for the selected word. This routine is repeated for each of the words. Thereafter, at step 108 the first region is selected, and another routine 110 is carried out to determine language confidence statistics for that region. A determination is made at step 112 whether any additional regions remain in the document, and if so steps 108 and 110 are repeated to determine the language confidence statistics for each region. After the confidence statistics are determined for each region, adjacent regions, e.g. consecutive lines, having sufficiently high confidence levels for a given language are clustered into subzones, in a routine 114. After all of the regions have been processed in this manner, the procedure ends at step 118. The result of this procedure is an ordered set of subzones each having a homogenous language identity.

Figure 5:
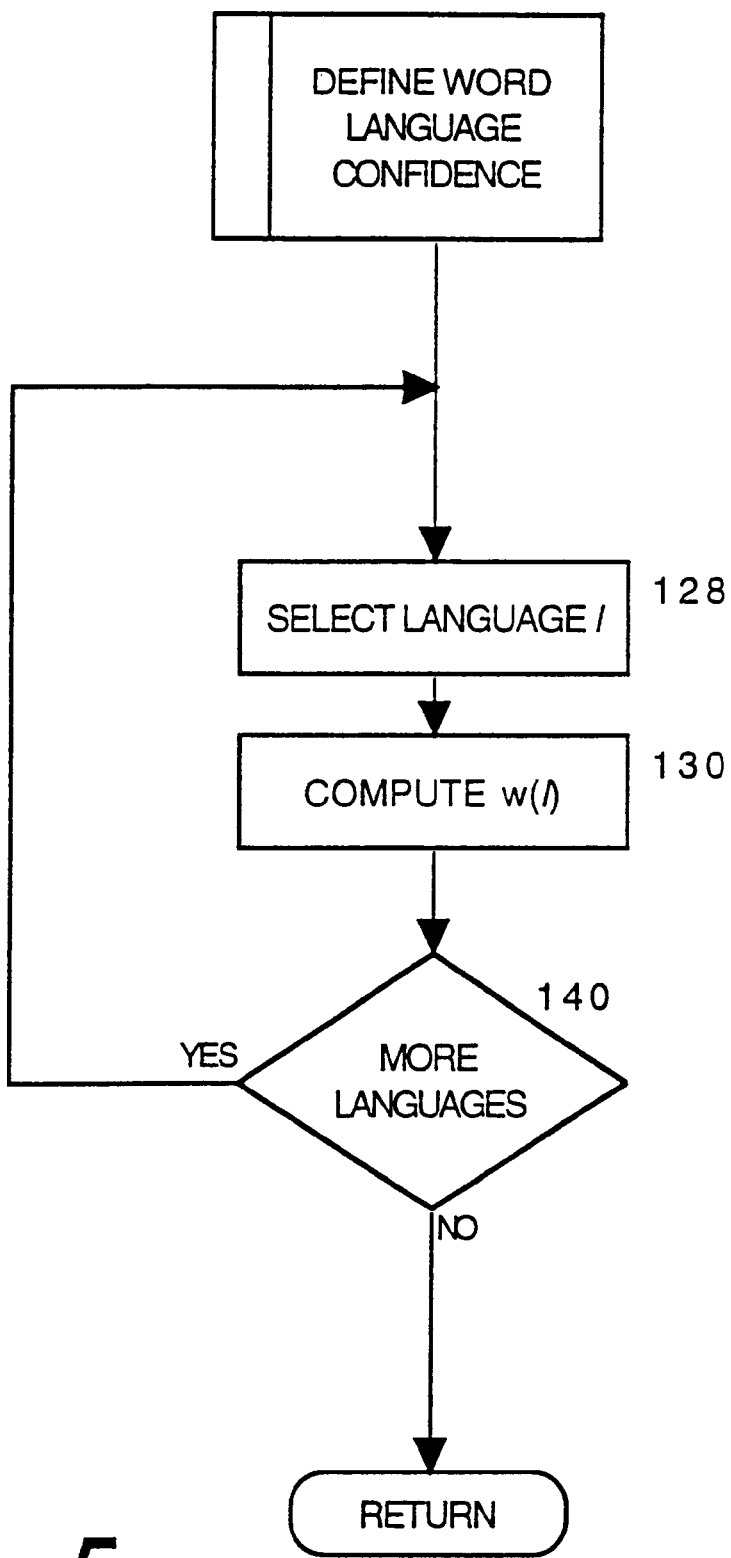
FIG. 5 is a flowchart of the subroutine for determining a word language confidence statistic.

The routine that is carried out at step 106, to define language confidence statistics for each of the words, is illustrated in greater detail in the flowchart of FIG. 5. At step 128 a first candidate language l is chosen. At step 130, a statistic $w(l)$ is computed which indicates a degree of confidence whether the selected word is contained in the chosen language. In one embodiment, the statistic can simply be a one or a zero, in dependence upon whether the word is found in the dictionary for the language. Other, more sophisticated approaches can be employed as well. For example, the confidence statistic w(l) for each word can be weighted in accordance with the length of the word. This approach is particularly useful for languages that have relatively long, unique words, such as German and Norwegian. Another factor that can be employed is to weight the value computed for each word as a function of the recognition probability associated with the individual characters in the word token, as determined by the classifier. With this approach, word estimates having a relatively low recognition probability will not affect the language confidence statistic as strongly as those which are more positively identified. In addition to indicating whether the selected word is found in the dictionary, the confidence statistic can take into account other factors as well. For example, it may be desirable to use n-gram information or word frequency information to weight the confidence statistic so that it is a factor of how often the character string in the word hypothesis appears in the chosen language.

At step 140, a determination is made whether additional languages remain to be processed for the selected word. If so, steps 128 and 130 are repeated, until the word has been compared against the dictionary for each of the candidate languages, and a confidence statistic is computed for each language. After all the languages have been examined and the confidence factors computed, the next word is chosen, and the subroutine is repeated. Once a confidence statistic is computed for each word, relative to each of the candidate languages, the main process continues.

Figure 6:
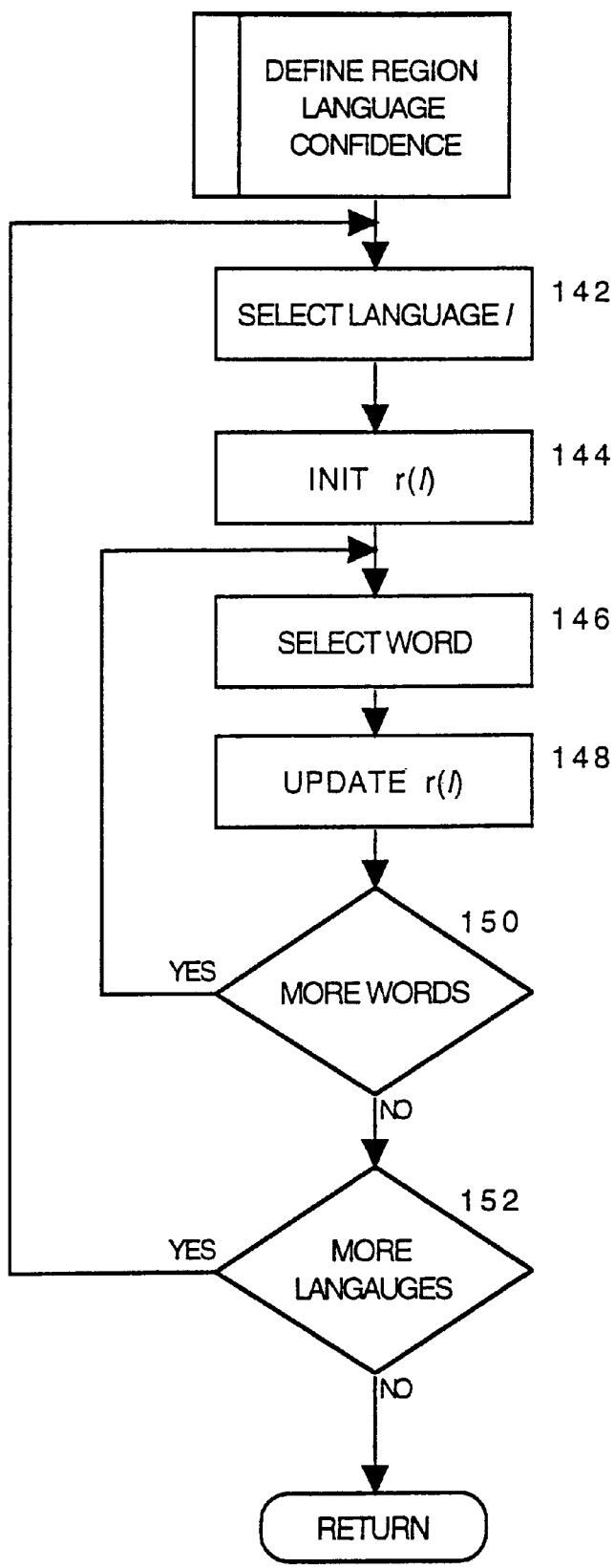
FIG. 6 is a flowchart of the subroutine for defining a region language confidence statistic.

The subroutine that is carried out at step 110, to determine language confidence statistics for a region, is illustrated in detail in the flowchart of FIG. 6. Referring thereto, at step 142, a first candidate language l is selected, and a language confidence statistic for the region r(l) is initialized, e.g. reset to zero, at step 144. The first word in the region is selected at step 146, and the region confidence factor for the selected language, r(l), is updated at step 148 in accordance with the selected word. For example, the region confidence factor might be a value stored in an accumulator. The updating of the factor can be carried out by adding the language confidence statistic w(l) for the selected word to the value stored in the accumulator.

The process then proceeds to step 150 to determine whether additional words in the region remain to be examined. Steps 146 and 158 are repeated for each word in the region, to obtain a confidence statistic r(l) related to the words in the region which are found in the dictionary for the selected language l. After all of the words have been examined, the updated value for r(l) is stored as the confidence factor for the selected language in the region. At step 152, a determination is made whether additional languages remain to be processed for the zone. If so, steps 142–150 are repeated, so that a confidence factor r(l) is determined for each language within the region. After all the languages have been examined and the confidence factors determined, the subroutine returns to the main process.

Figure 7:
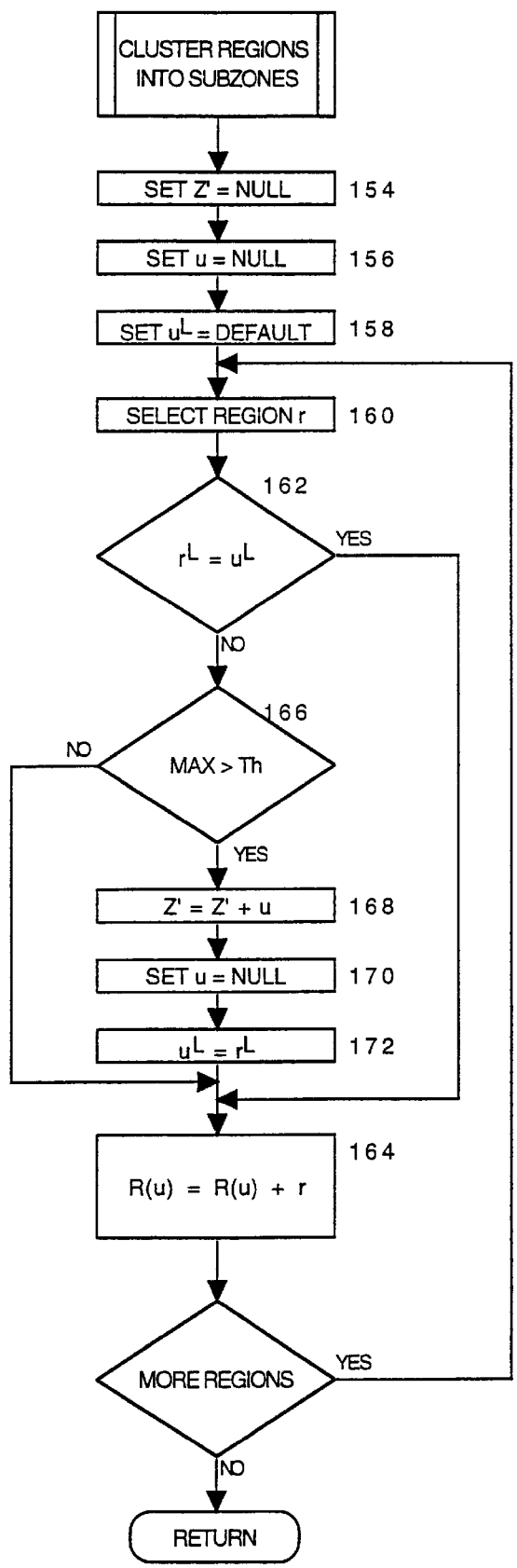
FIG. 7 is a flowchart of the subroutine for clustering regions into subzones.

The subroutine that is carried out at step 114, to cluster regions into language homogenous subzones, is illustrated in greater detail in the flowchart of FIG. 7. At step 154, the set of subzones Z' is initially defined as an empty, or null, set. A temporary variable u for the current subzone is also initially set to a null value, at step 156, and the language for the current subzone, $u^L$, is initially set to be any default language, at step 158. The first region r is then selected, at step 160, and a determination is made at step 162 whether the language confidence factors r(l) for that selected region indicate that the current subzone language $u^L$ is likely to be the language of the region, $r^L$. In other words, the confidence factors for each of the candidate languages are compared, and a determination is made whether the language confidence factor r(l) for the language of the current subzone is the highest, or at least sufficiently high relative to the other confidence factors for the region. If so, the selected region r is appended to the set of regions R(u) for the current subzone, at step 164.

If the current subzone language $u^L$ is not the most likely language for the region, i.e. the confidence factor r(l) for the subzone language is not sufficiently high among the confidence factors for the region of interest, a determination is made at step 166 whether the highest confidence factor $r(l)_{max}$ for the region is greater than a threshold value Th. If so, a new subzone can be started. Therefore, at step 168 the most recent subzone u, which is now complete, is appended to the set of subzones Z', the current subzone variable u is initialized at step 170, and the subzone language $u^L$ is changed to be the highest confidence language for the selected region at step 172, to begin the new subzone. Thereafter, the currently selected region r is appended to the new subzone, at step 164.

If, at step 166, the highest confidence factor for the region does not exceed the threshold, there is less likelihood that a new subzone is beginning. In the embodiment illustrated in the flowchart, the selected region is added to the set of regions R(u) in the current subzone. Alternatively, the region can be temporarily set aside while the next region is examined. If the confidence factors for the next region indicate that a new subzone is to be started, the previous region can be reexamined to see if it should be included in the new subzone. Thus, in an area of transition between two subzones, a look-ahead procedure can be employed to determine which of the two subzones has an associated language that is closest to that of the transition region.

The procedure in steps 160–172 is repeated for each region r, to define a set of subzones Z'. Each subzone comprises one or more consecutive regions which have been identified as containing text in the same language. Thus, in the case where each region is a line of text, a subzone comprises successive lines of text. When the next successive line is encountered having a different language, e.g. the beginning of a new paragraph, a new subzone is established.

In the preceding example of the invention, every word token is employed, and given equal weight, in determining the region confidence factor for the respective language dictionaries. In some cases, it may be desirable to be more selective in the values that are given to different respective words, to provide greater accuracy. For example, word tokens which consist of only a single character can be eliminated from consideration, to account for the fact that they could represent noise, rather than substantive content.

Figure 8:
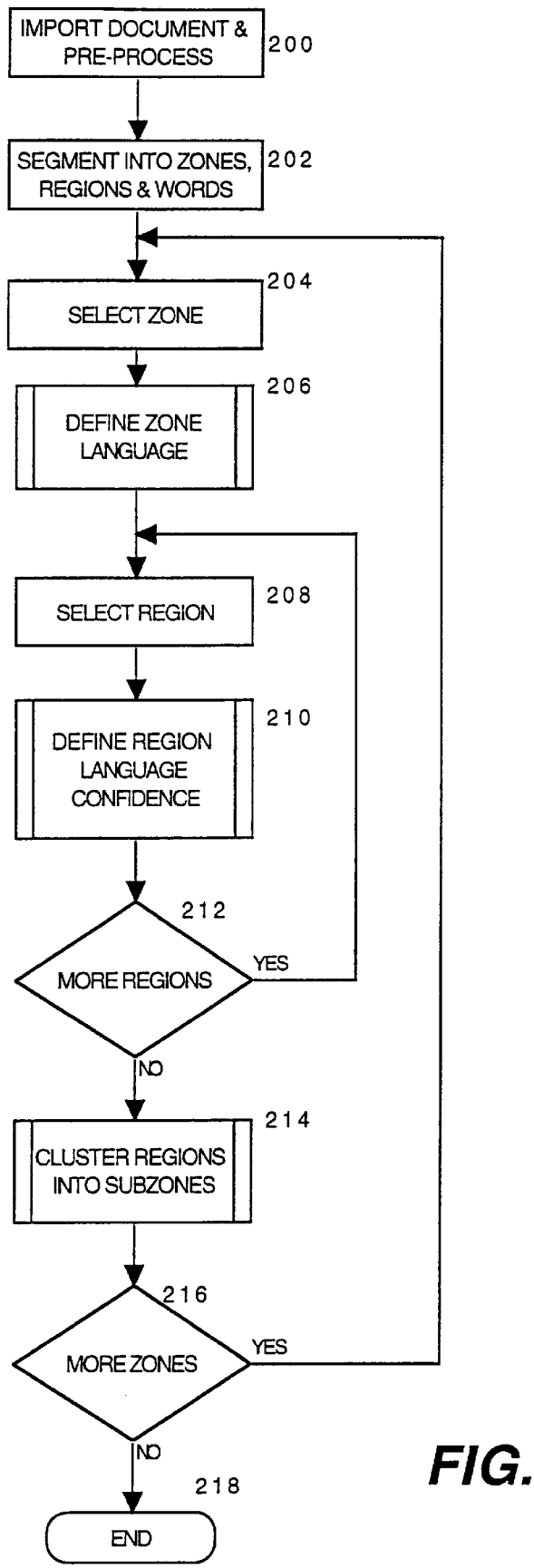
FIG. 8 is a flowchart of the overall process of a second embodiment of the present invention.

In the bottom-up approach of the preceding embodiment, the analysis of the document image to segregate different language regions begins with the smallest common element, namely the word token. In an alternative, top-down approach, the language for a larger zone can first be established, followed by separation into smaller language-homogenous regions. A flowchart which depicts the overall process for this embodiment of the invention is illustrated in FIG. 8. Referring thereto, at step 200, an image of the document is imported into the random access memory 16 of the computer, and preliminary processing is again conducted on the image, to correct for skew and filter out obvious artifacts. At step 202, the image of the document is segmented into zones, regions and word tokens, based upon geometric properties of the image. In the example of FIG. 3, the three vertical columns of text can be easily identified, based upon the thick white bars that separate them, to define separate zones. Within each column, the individual lines of text are identified by the horizontal strips of white between them, which delineate different regions. Similarly, within each line the individual word tokens are identified by the relative spacing between symbols. While the example of FIG. 3 depicts multiple zones, it is possible that the entire page could comprise a single zone.

Once the segmentation of the document has been completed, one zone is selected at step 204. A routine 206 is then carried out, to define a language for the zone. Thereafter, at step 208 the first region is selected, and another routine 210 is carried out to determine language confidence statistics for that region. A determination is made at step 212 whether any additional regions remain in the zone, and if so steps 208 and 210 are repeated to determine the language confidence statistics for each region. After the confidence statistics are determined for each region, regions having similar confidence levels for a given language are segregated from other regions which are not associated with that language to form homogenous subzones, in a routine 214. At step 216 a determination is carried out whether additional zones remain to be processed. If so, steps 204–214 are repeated for each additional zone. After all of the zones have been processed in this manner, the procedure ends at step 218. The result of this procedure is an ordered set of language homogeneous subzones within each zone.

Figure 9:
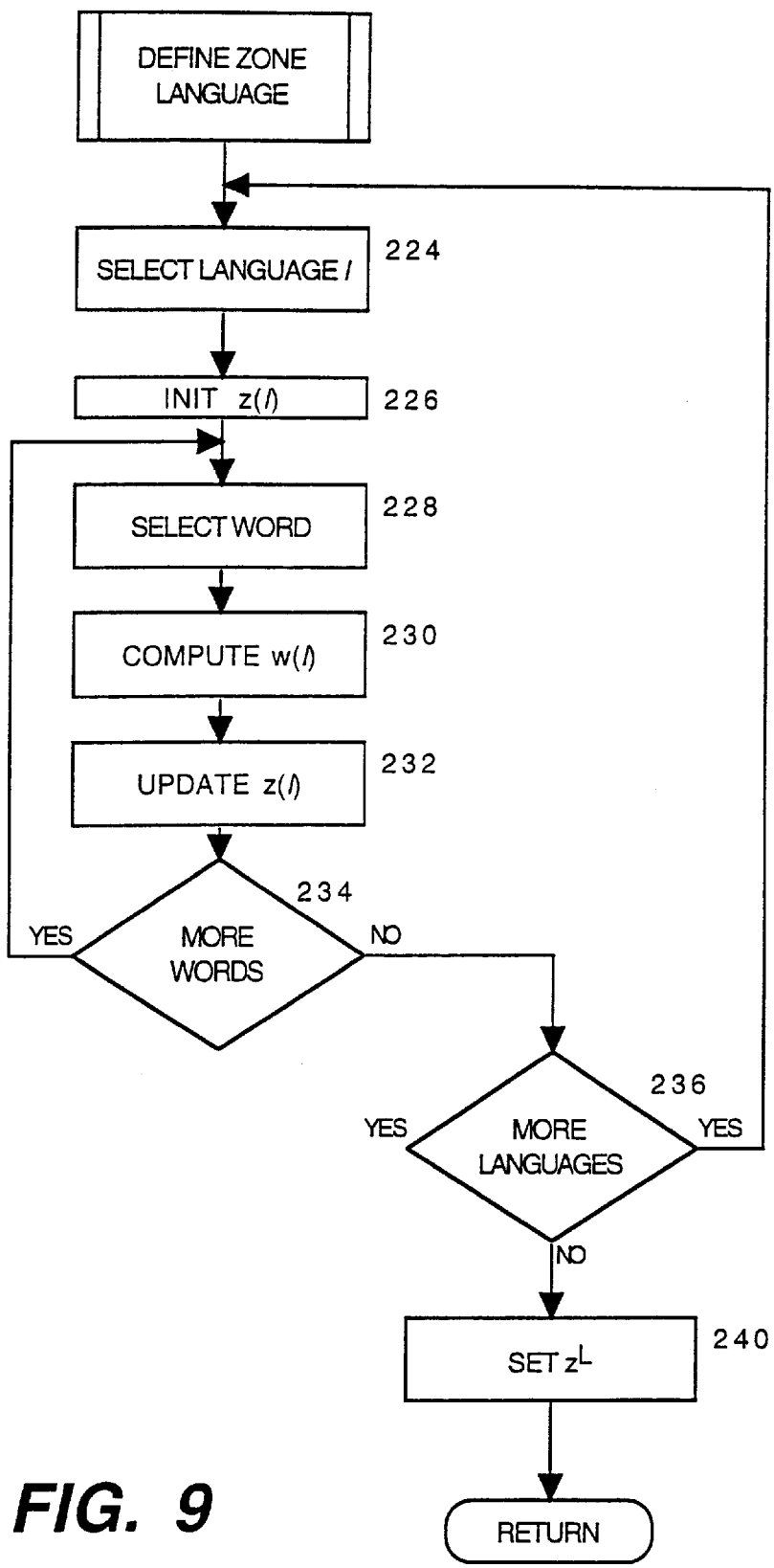
FIG. 9 is a flowchart of the subroutine for defining a zone language.

The routine that is carried out at step 206, to define the zone language, is illustrated in greater detail in the flowchart of FIG. 9. At step 224, a first candidate language l is selected, and a statistic for that language, z(l), is initialized at step 226. The first word in the zone is selected at step 228, and at step 230 a confidence statistic w(l) is computed for the word, in dependence upon whether the character string in that word token can be found in the dictionary for the selected language l. The language statistic z(l) is then updated at step 232, in accordance with the determined confidence value. For instance, the language statistic z(l) can be an accumulation of the individual confidence values w(l) for the words in the zone, relative to the selected language. The process then proceeds to step 234 to determine whether additional words in the zone remain to be examined.

Steps 228–232 are repeated for each word in the zone, to obtain the final value of z(l) for the selected language. In a relatively simple implementation, the statistic might be a count of the number of words in the zone which are found in the dictionary for the selected language l. After all of the words have been examined, a determination is made at step 236 whether additional languages remain to be processed for the zone. If so, steps 224–234 are repeated, until each of the words in the zone has been compared against the dictionary for each of the candidate languages. Once all of the languages have been examined in this manner, the zone language $z^L$ is chosen at step 240, based on the language statistic z(l) which presented the highest confidence value. In the simple implementation described above, the language having the highest frequency of words in the zone, i.e. the language whose dictionary generates the highest count, is ultimately selected as the zone language $z^L$ for that zone. After all the languages have been examined and the zone language identified, the subroutine returns to the main process.

Figure 10:
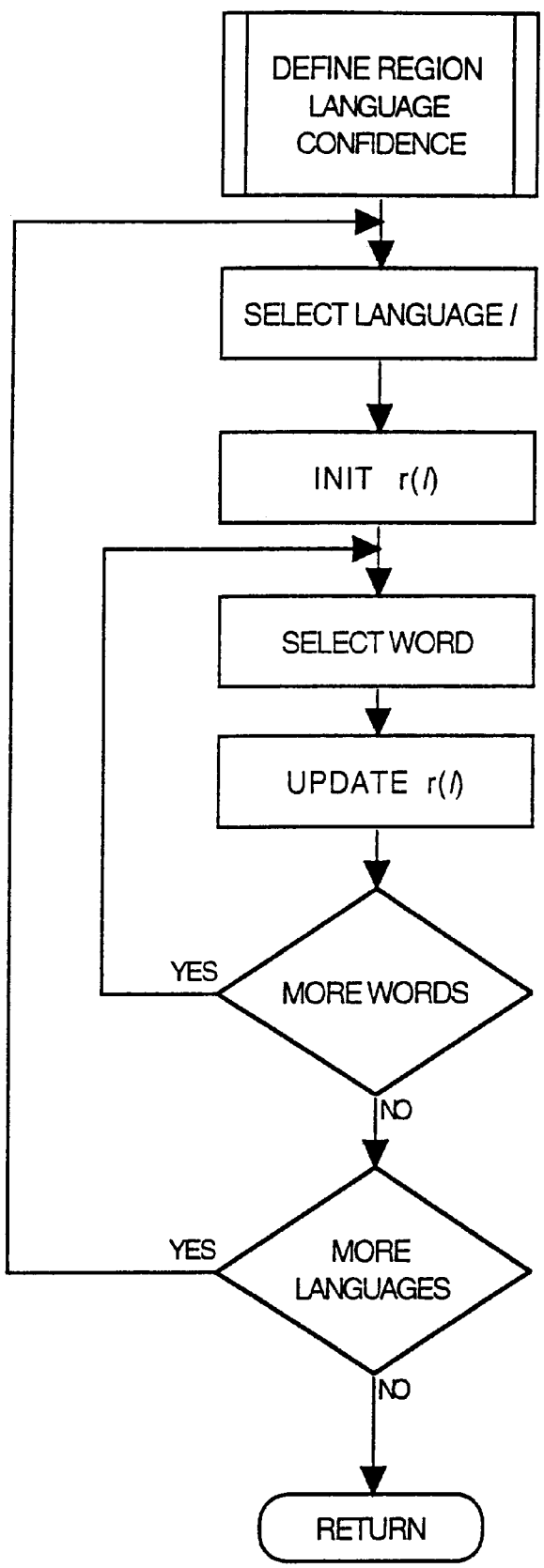
FIG. 10 is a flowchart of the subroutine for defining a region language.

The subroutine that is carried out at step 210, to define the region language, is illustrated in detail in the flowchart of FIG. 10. In a procedure similar to that carried out at steps 224–236 in the flowchart of FIG. 9, each word in a region is examined to determine a region confidence value r(l) for a selected language l. This procedure is repeated for each of the candidate languages, to identify the most likely language for the region.

Figure 11:
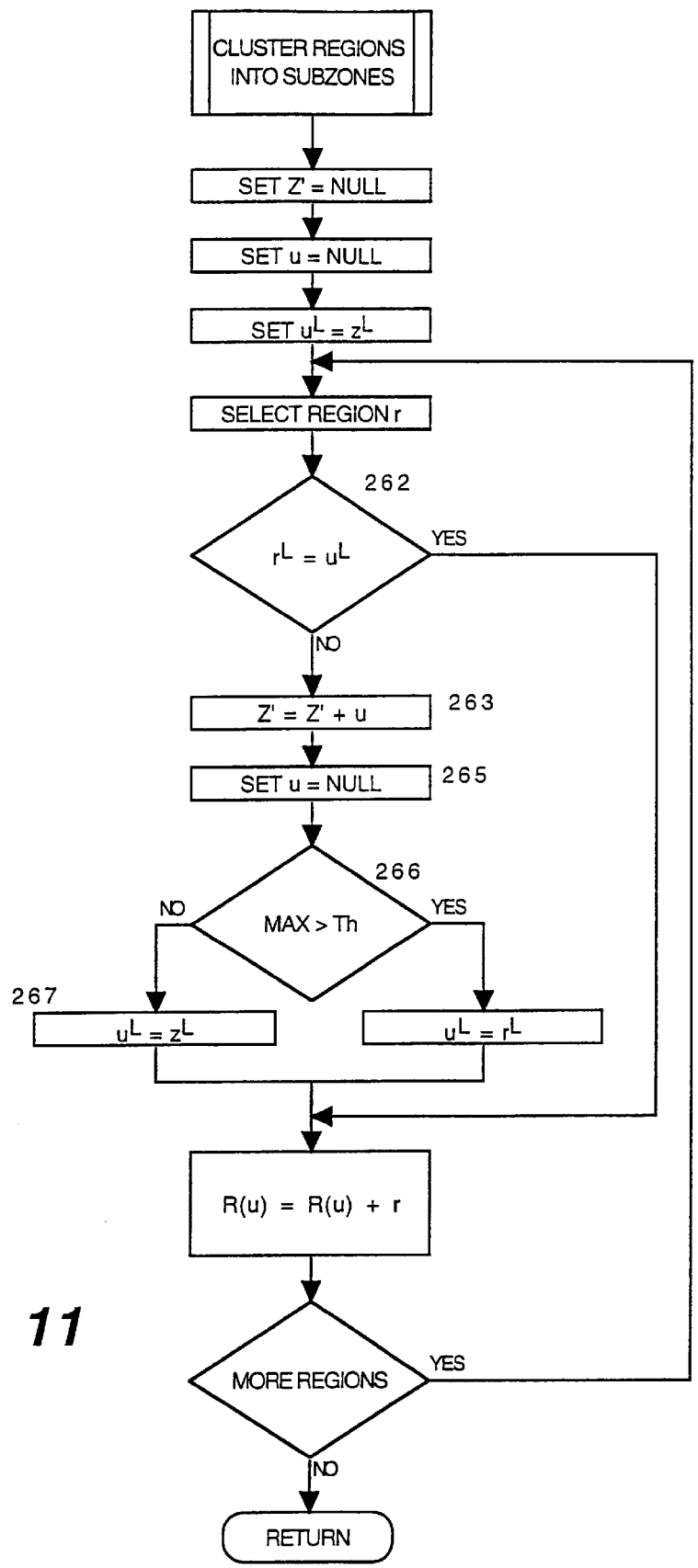
FIG. 11 is a flowchart of the subroutine for segregating regions into subzones.

Once a confidence value is determined for each region, the process returns to the main routine. Thereafter, the regions are segregated into homogenous language subzones in the subroutine 214. This can be accomplished, for example, in a manner similar to the clustering procedure shown in the flowchart of FIG. 7. However, in this embodiment, the zone language $z^L$ is used in the determination of the subzones. FIG. 11 illustrates this difference. Referring thereto, at step 262, if the region language $r^L$ is not the same as the current subzone language $u^L$, the current subzone is completed at step 263 by adding it to the set of subzones Z', and the current subzone variable u is initialized at step 265, to start a new subzone. At step 266, if a determination is made that the confidence value r(l) for the currently selected region is not sufficiently high to cause a switch to a new subzone, the subzone language $u^L$ for a new subzone is set to the zone language $z^L$ as a default, in step 267. In other words, when there is uncertainty about the prevailing language of a region, the assumption is made that it is in the predominant language of the zone in which that region appears, and it is grouped in a subzone associated with that language. Thus, the initial determination of a zone language allows the clustering process to employ a more conservative criterion in connection with whether to switch subzones when a low confidence value is encountered.

A third embodiment of the invention, referred to as the hybrid approach, employs some of the techniques that are carried out in each of the first two embodiments. In particular, in this embodiment, a zone language is first determined for each of the document's zones, as in the top-down approach. Thereafter, the process proceeds in the manner of the bottom-up approach, to determine a confidence factor for each word and then a region language for each region. In this case, as in the top-down approach, the zone language can be used to assist in the clustering of regions into subzones.

It will be appreciated by those of ordinary skill in the art that the present invention can be embodied in other specific forms without departing from the spirit or essential characteristics thereof. For instance, in the specific implementations illustrated in the accompanying flowcharts, a confidence statistic is computed for every word in a zone, for each of the candidate languages. Thereafter, all of the computed confidences are used in the determination of the zone language and the region language. However, in an optimized implementation it may not be necessary to compute a confidence statistic for every word or for each language. Rather, if the confidence statistic for one language is sufficiently high to reliably determine that the correct language for a word has been identified, the computation can be terminated at that point, without computing confidence values for any other languages. Similarly, if enough words in a zone or region have been determined to be all of the same language, then the language of that zone or region can be selected without having to examine every remaining word. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for automatically determining one or more languages associated with text in a document, comprising the steps of:

segmenting the document into a plurality of word tokens;

forming at least one hypothesis of the characters in said word tokens;

defining a dictionary for each one of plural languages;

determining confidence factors with respect to said plural languages for said word hypotheses, which factors are based on whether the dictionary for a given language indicates whether a word hypothesis is found in that language;

defining a plurality of regions in the document, each of which contains at least one word;

determining a language confidence factor for each region, based upon the confidence factors associated with the words in the region; and clustering regions which have relatively high confidence factors for a given language to form a subzone that is identified with the given language.

2. The method of claim 1 wherein a hypothesis is formed only for words having a minimum length of at least two characters.

3. The method of claim 1 wherein said confidence factors for hypothesized words are weighted in accordance with the lengths of the hypothesized words.

4. The method of claim 1 further including the steps of determining a recognition probability for each hypothesis, and weighting said confidence factors in accordance with the recognition probabilities.

5. The method of claim 1 wherein said confidence factors for hypothesized words are weighted in accordance with the frequencies with which the hypothesized words appear in the respective languages.

6. The method of claim 1 wherein said initial hypothesis is formed by means of a classifier that is generic to each of said plural languages.

7. The method of claim 1, wherein a separate dictionary is defined for each of said languages.

8. The method of claim 1, wherein said dictionary is common to a plurality of said languages, and includes information indicating which languages contain words in the dictionary.

9. A method for automatically segmenting a document into homogenous language subzones, comprising the steps of:

defining at least one zone in the document which contains a plurality of words;

defining a dictionary for each one of plural languages;

for each word in the zone, determining a confidence factor with respect to each of said plural languages, which factor is based on whether the respective dictionaries contain the word;

identifying a zone language for the zone, based upon the confidence factors associated with the words in the zone;

selecting a local region in the zone which contains at least one word;

identifying a region language for the local region, based upon the confidence factor associated with the words in the region;

determining whether the region language is the same as the zone language; and segregating the local region from other regions in the zone if its region language is not the same as the zone language.

10. A method for automatically determining one or more languages associated with text in a document, comprising the steps of:

segmenting the document into a plurality of zones containing regions of word tokens;

forming at least one hypothesis of the characters in said word tokens;

defining a dictionary for each one of plural languages;

for each hypothesized word, determining which ones of said dictionaries contain the hypothesis for the word and determining a confidence value for each language;

identifying a zone language for each zone, based upon the confidence values associated with the words in the zone;

identifying a region language for each region, based upon the confidence values associated with the words in the region;

designating the zone language as the region language if the confidence values associated with the words in the region are not sufficiently high; and clustering regions in a zone which have the same region language to form a subzone that is identified with a particular language.

11. The method of claim 10 wherein a hypothesis is formed only for words having a predetermined minimum number of characters greater than one.

12. The method of claim 10 further including the step of weighting said confidence values in accordance with the lengths of the hypothesized words.

13. The method of claim 10 further including the steps of determining a recognition probability for each hypothesis, and weighting said confidence values in accordance with the recognition probabilities.

14. The method of claim 10 wherein said initial hypothesis is formed by means of a classifier that is generic to each of said plural languages.

15. A method for automatically determining one or more languages associated with text in a document, comprising the steps of:

segmenting the document into a plurality of word tokens;

forming at least one hypothesis of the characters in said word tokens;

for each word hypothesis, determining a confidence factor that indicates whether the word is contained in each of said plural languages;

defining a plurality of regions in the document, each of which contains at least one word;

determining a language confidence factor for each region, based upon the confidence factors associated with the words in the region; and clustering regions which have relatively high confidence factors for a given language to form a subzone that is identified with the given language.

16. A method for automatically segmenting a document into homogenous language subzones, comprising the steps of:

defining at least one zone in the document which contains a plurality of words;

for each word in the zone, determining a confidence factor that indicates whether the word is contained in each of said plural languages;

identifying a zone language for the zone, based upon the confidence factors associated with the words in the zone;

selecting a local region in the zone which contains at least one word;

identifying a region language for the local region, based upon the confidence factor associated with the words in the region;

determining whether the region language is the same as the zone language; and segregating the local region from other regions in the zone if its region language is not the same as the zone language.

* * * * *